L. W. LANGDON.
Stove Damper.

No. 97,414.

Patented Nov. 30, 1869.

Witnesses:
Geo. D. Rothwell
Phil. F. Larner

Inventor:
L. W. Langdon

United States Patent Office.

L. W. LANGDON, OF NORTHAMPTON, MASSACHUSETTS, ASSIGNOR TO HIMSELF AND EDWIN R. LOCKE, OF KEENE, NEW HAMPSHIRE.

Letters Patent No. 97,414, dated November 30, 1869.

---

STOVE-DAMPER.

---

The Schedule referred to in these Letters Patent and making part of the same.

---

*To all whom it may concern:*

Be it known that I, L. W. LANGDON, of Northampton, in the county of Hampshire, and State of Massachusetts, have invented a new and useful Stove-Damper; and I do hereby declare that the following is a full, clear, and exact description of the same, sufficient to enable others skilled in the art to which my invention appertains, to make and use the same, reference being had to the accompanying drawings, forming part of this specification, in which—

Figure 1:
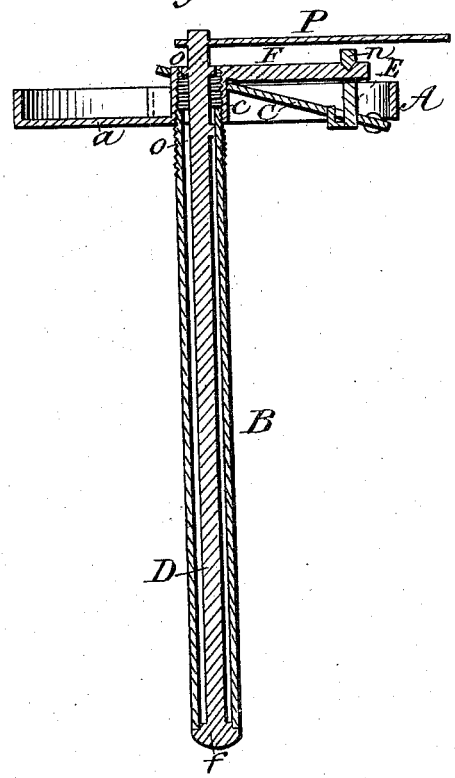
Figure 1 is a longitudinal central section of my damper.
Figure 2:
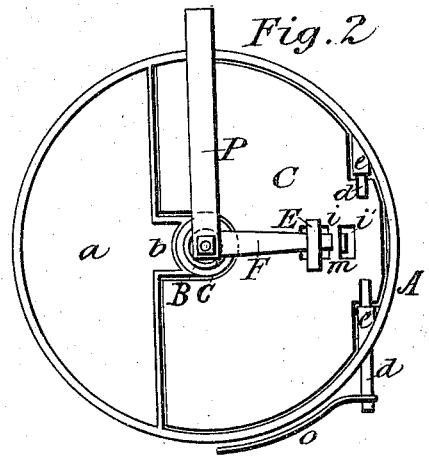
Figure 2 is a top view of the same.

My invention is an improvement in that class of automatic dampers which is operated by means of the expansion and contraction of metal, caused by heat and cold: and It consists—

First, in the employment of a metallic tube, in such a manner that its expansion and contraction shall operate to open and close a valve.

Second, in the application of an adjusting-lever to the automatic heat-regulator, whereby the valve may be raised or lowered, according to the state of the weather, whether cold or warm; together with other devices perfecting the damper, as will be hereinafter fully described.

Similar letters of reference indicate corresponding parts in the two figures.

My invention will be fully understood by reference to the accompanying drawings, wherein—

A represents a ring, cast with a partial cover, *a*, having an offset, *b*, formed with a central tube, *c*, screw-threaded on the inside.

Into this centre is screwed a tube, B, made of metal which readily expands by the effect of heat. Brass will be most likely used for this purpose.

C represents a valve, cast with journals *d d*, resting in bearings *e e*, cast with the ring A.

This valve is so formed as to fill all the vacant space of the ring.

The valve is also cast with two openings, *i i'*.

D is a rod, of metal of less expansibility than the metal composing the tube B, in which said rod D is fitted.

This rod is formed with a head, *f*, and two collars, *o o*, near its opposite end, which projects from the tube, as shown.

E is an L-shaped casting, caught under the bar *m*, which separates the openings *i i'* in the valve.

In the upper part of this casting a rectangular opening is formed to receive the end of a lever, F, notched to engage with the bevelled surface *n*, of the piece E.

Near the opposite end of this lever F, a notch is formed, which rests on the top of tube *c*, in a recess formed for its reception.

The extreme end of lever F is so formed as to catch under the collar *o* on rod D.

O is an indicator, fixed on one of the journals of the valves C, and operating outside the pipe in which the damper is situated.

P represents a lever, fixed on the rod D, and extending out through a slot in the stove-pipe.

This lever is operated from right to left, for adjustment.

It will be observed that the tube B can be adjusted longitudinally by screwing it in or out, to obtain different degrees of heat in different stoves.

The lever P regulates the heat when the tube is set.

This lever partially rotates the rod to which it is attached, and which has a cam or screw to raise and lower the valve, according as the weather is more or less cold.

As the tube B is of more expansible metal than the rod which it encloses, it must, as it is lengthened by the heat, draw the rod down, thus closing the valve.

As the tube cools, it contracts, and allows the rod to assume its former position, thus opening the valve.

The further the lever P is set to the left, the less heat is required to close the valve.

Having thus described my invention,

What I claim as new, and desire to secure by Letters Patent, is—

1. The employment of a tube, B, in such a manner that its expansion and contraction shall operate to open and close the valve, substantially as herein described.

2. The adjusting-lever P, when connected to an automatic heat-regulator, placed inside the pipe, substantially as herein described.

3. The combination of the ring A, tube B, valve C, rod D, lever F, casting E, and lever P, all operating substantially as herein described.

4. In combination with the above, the indicator O, arranged substantially as herein set forth.

To the above specification of my improvement in stove-pipe dampers, I have signed my name, this 9th of January, 1869.

L. W. LANGDON.

Witnesses:
 HENRY W. KENNEY,
 ORANGE WRIGHT.